(12) United States Patent
Hwang et al.

(10) Patent No.: US 8,390,929 B2
(45) Date of Patent: Mar. 5, 2013

(54) DISPLAY PANEL AND OPTICAL FILTER WHICH CONTROL TRANSMITTANCE COLOR AND REFLECTION COLOR

(75) Inventors: Cha-Won Hwang, Suwon-si (KR); Sang-Mi Lee, Suwon-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 417 days.

(21) Appl. No.: 12/591,991

(22) Filed: Dec. 7, 2009

(65) Prior Publication Data
US 2010/0142052 A1 Jun. 10, 2010

(30) Foreign Application Priority Data
Dec. 5, 2008 (KR) .................. 10-2008-0123508

(51) Int. Cl.
*G02B 1/10* (2006.01)
(52) U.S. Cl. .................. 359/584; 349/106; 361/818
(58) Field of Classification Search .................. None
See application file for complete search history.

(56) References Cited

U.S. PATENT DOCUMENTS

| | | | |
|---|---|---|---|
| 5,488,436 A | 1/1996 | Choi et al. | |
| 6,097,456 A | 8/2000 | Wang | |
| 6,169,590 B1 | 1/2001 | Abileah et al. | |
| 6,313,894 B1 | 11/2001 | Sekine et al. | |
| 6,391,462 B1 | 5/2002 | Jang | |
| 6,522,794 B1 | 2/2003 | Bischel et al. | |
| 6,628,355 B1 | 9/2003 | Takahara | |
| 6,819,468 B2 | 11/2004 | Dho | |
| 6,978,936 B2 | 12/2005 | Tsikos et al. | |
| 6,997,386 B2 | 2/2006 | Tsikos et al. | |
| 7,090,133 B2 | 8/2006 | Zhu | |
| 7,116,309 B1 | 10/2006 | Kimura et al. | |
| 7,205,098 B2 | 4/2007 | Cho et al. | |
| 7,269,322 B2 | 9/2007 | Jung et al. | |
| 7,372,639 B2 | 5/2008 | Kim | |
| 7,409,119 B2 | 8/2008 | Jung et al. | |
| 7,452,603 B2* | 11/2008 | Fleury et al. | .................. 428/426 |
| 7,495,814 B2 | 2/2009 | Yun et al. | |

(Continued)

FOREIGN PATENT DOCUMENTS

| | | |
|---|---|---|
| JP | 07-281005 | 10/1995 |
| JP | 2001272532 A | 10/2001 |

(Continued)

OTHER PUBLICATIONS

Chinese Office Action issued by Chinese Patent Office on May 25, 2011, corresponding to Chinese Application No. 200910225779.6 and its English Translation attached herewith.

(Continued)

*Primary Examiner* — Arnel C Lavarias
(74) *Attorney, Agent, or Firm* — Robert E. Bushnell, Esq.

(57) ABSTRACT

A display panel easily implements reflection color of a display. The display panel includes a panel which has a plate shape to implement an image, and an optical filter which is attached to the panel. The optical filter includes a color compensating layer which implements transmittance color by controlling transmittance light passing from an interior to an exterior of the panel, and a reflection layer which implements reflection color by controlling reflection light which is incident from the exterior to the panel, and which is reflected.

15 Claims, 4 Drawing Sheets

U.S. PATENT DOCUMENTS

| | | |
|---|---|---|
| 7,505,104 B2 | 3/2009 | Watanabe et al. |
| 7,508,654 B2 | 3/2009 | Lee et al. |
| 7,510,288 B2 | 3/2009 | Shin et al. |
| 2005/0117283 A1 | 6/2005 | Lee et al. |
| 2006/0127818 A1 | 6/2006 | Cho et al. |
| 2006/0138923 A1 | 6/2006 | Sohn |
| 2006/0144713 A1 | 7/2006 | Song et al. |
| 2006/0164741 A1 | 7/2006 | Hwang et al. |
| 2006/0286465 A1 | 12/2006 | Kim |
| 2007/0008625 A1 | 1/2007 | Park et al. |
| 2007/0041681 A1 | 2/2007 | Jung et al. |
| 2007/0121221 A1 | 5/2007 | Kim |
| 2007/0188890 A1 | 8/2007 | Jo et al. |
| 2007/0195519 A1 | 8/2007 | Shin et al. |
| 2007/0242177 A1 | 10/2007 | Lee et al. |
| 2008/0024882 A1 | 1/2008 | Park et al. |
| 2008/0068538 A1 | 3/2008 | Huang et al. |
| 2008/0088949 A1 | 4/2008 | Oh et al. |
| 2008/0130143 A1 | 6/2008 | Oh et al. |
| 2008/0149865 A1 | 6/2008 | Han et al. |
| 2008/0170039 A1 | 7/2008 | Shin et al. |
| 2008/0186594 A1 | 8/2008 | Jeong et al. |
| 2008/0225408 A1 | 9/2008 | Park et al. |
| 2008/0225411 A1 | 9/2008 | Kim et al. |
| 2008/0239486 A1 | 10/2008 | Kato et al. |
| 2008/0239488 A1 | 10/2008 | Asakura et al. |
| 2008/0259478 A1 | 10/2008 | Seo et al. |
| 2008/0303996 A1 | 12/2008 | Morisawa et al. |
| 2009/0040440 A1 | 2/2009 | Park |
| 2009/0040619 A1 | 2/2009 | Choi et al. |

FOREIGN PATENT DOCUMENTS

| | | |
|---|---|---|
| JP | 2004062112 A * | 2/2004 |
| JP | 2008-009142 | 1/2008 |
| KR | 100618374 B1 | 1/2004 |
| KR | 10-2004-0072423 | 8/2004 |
| KR | 10-2007-0054850 | 5/2007 |
| KR | 10-2007-0082686 | 8/2007 |
| KR | 10-2008-0006347 | 1/2008 |

OTHER PUBLICATIONS

Chinese Rejection Decision issued by CPO on May 2, 2012 in connection with Chinese Patent Application No. 200910225779.6, which also claims Korean Patent Application No. 10-2008-0123508.

* cited by examiner

DISPLAY PANEL AND OPTICAL FILTER WHICH CONTROL TRANSMITTANCE COLOR AND REFLECTION COLOR

CLAIM OF PRIORITY

This application makes reference to, incorporates the same herein, and claims all benefits accruing under 35 U.S.C. §119 from an application earlier filed in the Korean Intellectual Property Office on Dec. 5, 2008 and there duly assigned Serial No. 10-2008-0123508.

BACKGROUND OF THE INVENTION

1. Field of the Invention

An aspect of the present invention relates to a display panel and an optical filter. More particularly, an aspect of the present invention relates to a display panel and an optical filter which easily implement reflection colors of displays.

2. Description of the Related Art

Generally, an optical filter for display controls optical characteristics of the display, for example, luminance, color temperature, color coordinate, anti-reflection, reflective luminance and reflective color, while being positioned between the display and a viewer.

For example, an optical filter forms an anti-reflection layer at the outermost part thereof, a color compensating layer at a lower part thereof, and a plurality of optical functional layers.

In the optical filter, among the optical characteristics, as a method for controlling a reflection color of a display, there are a method for controlling a reflection spectrum to control a reflection color in a reflection prevention layer, and a method for controlling a color compensating layer transmittance spectrum to control a transmittance color in a color compensating layer.

In the case where a reflection color is implemented by controlling a transmittance spectrum of a color compensating layer for controlling a transmittance color, the reflection color is implemented and the transmittance color is changed in the color compensating layer so as to control the transmittance color. In addition, the color compensating layer for controlling the transmittance color insignificantly affects the implementation of the reflection color.

That is, since the color compensating layer for controlling the transmittance color must maintain a transmittance color controlling capability with respect to transmittance light, which is an intrinsic ability, it is limited in controlling the reflection color with respect to the reflection light.

In the case where the reflection color is implemented by controlling the reflection spectrum of the reflection prevention layer, a color and a concentration which are capable of being implemented are limited on the basis of control principle. In the principle of controlling the reflection spectrum, by controlling the refractive index and the thickness of the multilayer which constitutes the reflection prevention layer, the reflection spectrum which has a minimum point at a specific wavelength is controlled. Thereby, the reflection color is implemented.

That is, in the case where the reflection color is implemented by controlling the reflection spectrum of the reflection prevention layer, the color and the concentration which are capable of being implemented are limited or the transmittance color is changed while the reflection color is implemented. In addition, the reflection prevention layer insignificantly affects changing of the reflection color with respect to changing of the transmittance color.

The above information disclosed in this Background section is only for enhancement of an understanding of the background of the invention, and therefore it may contain information that does not form the prior art which is already known in this country to a person of ordinary skill in the art.

SUMMARY OF THE INVENTION

An aspect of the present invention has been developed in an effort to provide a display panel and an optical filter which easily implement reflection colors of displays.

An exemplary embodiment of the present invention provides a display panel and an optical filter which control transmittance color and reflection color by forming a color compensating layer which transmits internal light and a reflection layer which reflects external light.

The display panel according to an exemplary embodiment of the present invention includes: a panel which has a plate shape to implement an image; and an optical filter which is attached to the panel. The optical filter includes a color compensating layer which implements transmittance color by controlling transmittance light passing from the interior to the exterior of the panel, and a reflection layer which implements reflection color by controlling reflection light which is incident from the outside to the panel and reflected.

The color compensating layer may include the first color compensating layer which is disposed at the panel side while the reflection layer is disposed therebetween, and the second color compensating layer which is disposed at a side opposite to the first color compensating layer.

The display panel according to an exemplary embodiment of the present invention may further include an EMI shield layer which is disposed between the first color compensating layer and the panel.

The optical filter may further include a first adhesive layer disposed between the panel and the EMI shield layer, and a second adhesive layer disposed between the EMI shield layer and the first color compensating layer.

The display panel according to an exemplary embodiment of the present invention may further include a hard coating layer disposed outside the second color compensating layer.

The display panel according to an exemplary embodiment of the present invention may further include a polarizing film layer disposed between the first color compensating layer and the reflection layer.

The optical filter may further include the first adhesive layer disposed between the panel and the polarizing film layer, and the second adhesive layer disposed between the polarizing film layer and the reflection layer.

The optical filter according to an exemplary embodiment of the present invention may include a color compensating layer which implements transmittance color by controlling transmittance light passing from the interior to the exterior of the panel having the plate shape for implementing an image, and a reflection layer which implements reflection color by controlling reflection light incident from the outside to the panel and reflected.

The color compensating layer may include a first color compensating layer disposed at the panel side while the reflection layer is disposed therebetween, and a second color compensating layer disposed at a side opposite to that of the first color compensating layer.

The optical filter according to an exemplary embodiment of the present invention may further include an EMI shield layer disposed between the first color compensating layer and the panel.

The optical filter according to an exemplary embodiment of the present invention may further include a first adhesive layer disposed between the panel and the EMI shield layer, and a second adhesive layer disposed between the EMI shield layer and the first color compensating layer.

The optical filter according to an exemplary embodiment of the present invention may further include a hard coating layer disposed outside of the second color compensating layer.

The optical filter according to an exemplary embodiment of the present invention may further include a polarizing film layer disposed between the first color compensating layer and the reflection layer.

The optical filter according to an exemplary embodiment of the present invention may further include a first adhesive layer disposed between the panel and the polarizing film layer, and a second adhesive layer disposed between the polarizing film layer and the reflection layer.

The reflection layer may have a reflection ratio in the range of 10% to 60% and may reflect external light which is incident on the panel from the outside so as to form the reflection light.

The reflection layer may have a transmittance in the range of 40% to 90% and transmit internal light from the interior of the panel to the exterior of the panel so as to form the transmittance light.

The first color compensating layer and the second color compensating layer may each have a transmittance in the range of 65% to 90%, and may transmit internal light from the interior of the panel to the exterior of the panel so as to form the transmittance light.

The reflection layer may be formed of any one of silver (Ag) and a silver alloy. The silver alloy may be formed of any one of Ag—Au, Ag—Pd, Ag—Pt, Ag—ITO and Ag—Ni.

The reflection layer may be formed of any one of aluminum (Al) and an aluminum alloy. The aluminum alloy may be formed of any one of Al—Au, Al—Pd, Al—ITO and Al—Ni.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, an aspect of the present invention will be described more fully hereinafter with reference to the accompanying drawings, in which exemplary embodiments of the invention are shown. As those skilled in the art would understand, the described embodiments may be modified in various different ways, all without departing from the spirit or scope of the present invention. The drawings and description are to be regarded as illustrative in nature and not restrictive. Like reference numerals designate like elements throughout the specification.

In an aspect of the present invention, a display panel includes a flat panel display panel. For example, the display panel may be a plasma display panel (PDP), a liquid crystal display (LCD) or a field emission display (FED). For convenience, the present exemplary embodiment will be described mainly with reference to a plasma display panel (PDP).

Figure 1:
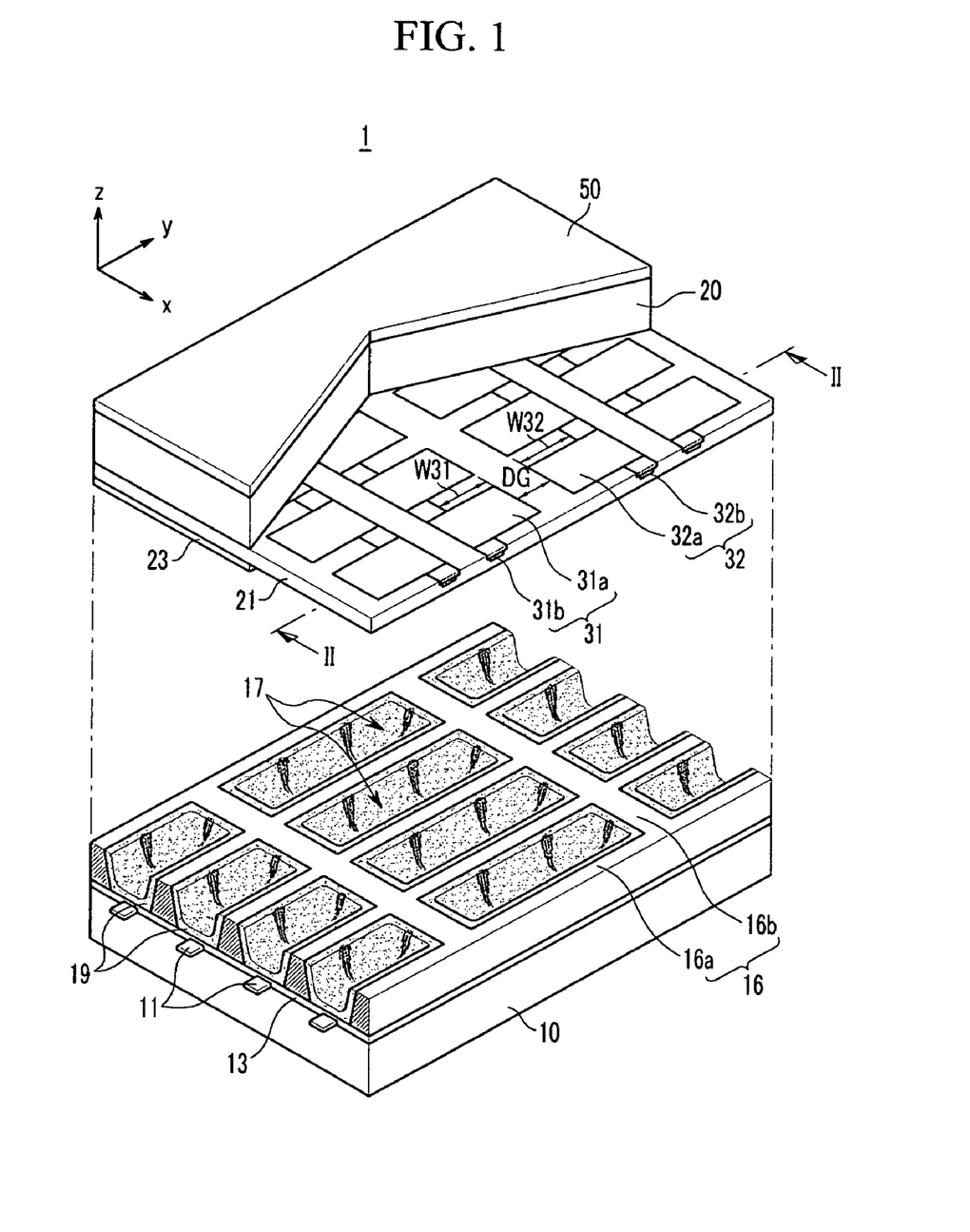
FIG. 1 is an exploded perspective view of a display panel according to a first exemplary embodiment of the present invention.
Figure 2:
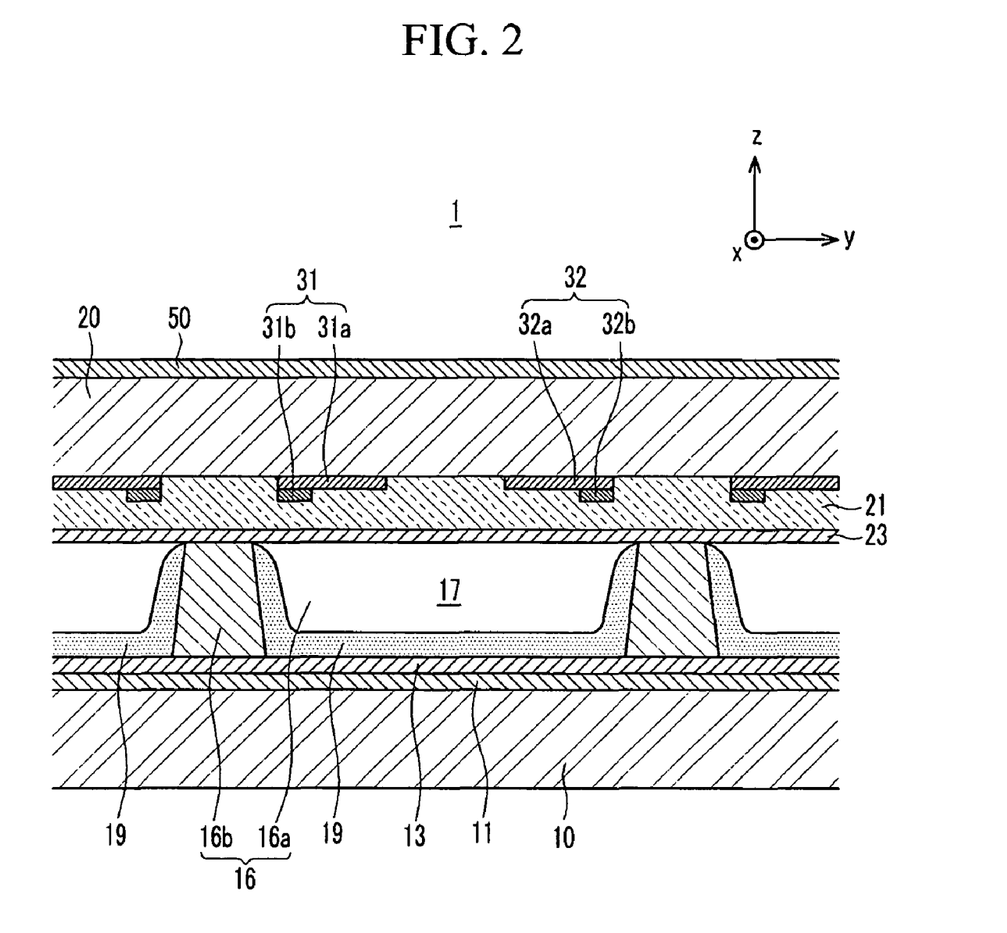
FIG. 2 is a cross-sectional view taken along the line II-II of FIG. 1.

FIG. 1 is an exploded perspective view of a display panel according to a first exemplary embodiment of the present invention, and FIG. 2 is a cross-sectional view taken along the line II-II of FIG. 1.

Referring to FIGS. 1 and 2, a plasma display panel (PDP) 1 according to an exemplary embodiment includes a rear substrate 10 and a front substrate 20, opposed to each other and to be sealed, and a barrier rib 16 which partitions discharge cells 17 between the substrates 10 and 20.

A discharge gas (for example, mixed gas including neon (Ne) and xenon (Xe), etc.) is charged in the discharge cell 17 so as to generate vacuum ultraviolet (VUV) rays at the time of a gas discharge. A phosphor layer 19 is formed in the discharge cell 17 to absorb the vacuum ultraviolet (VUV) rays so as to emit visible light.

In order to implement the gas discharge, the plasma display panel (PDP) 1 includes an address electrode 11 disposed between the rear substrate 10 and the front substrate 20 and corresponding to the respective discharge cells 17, a first electrode (hereinafter, referred to as "sustain electrode") 31, and a second electrode (hereinafter, referred to as "scan electrode") 32.

For example, the address electrode 11 is elongated in a first direction (y axis direction in the drawing) on the inner surface of the rear substrate 10 so as to be continuously disposed on the adjacent discharge cells 17 in the y-axis direction.

A first dielectric layer 13 covers the address electrodes 11 and the inner surface of the rear substrate 10. The first dielectric layer 13 prevents positive ions or electrons from colliding directly with the address electrode 11 at the time of the gas discharge so as to prevent the address electrode 11 from being damaged, and provides a space for forming and accumulating wall charge.

The address electrode 11 is disposed on the rear substrate 10 so as not to prevent the visible light from being emitted forward so that it may be formed of an opaque electrode, that is, a metal electrode having excellent electrical conductivity.

The barrier rib 16 is formed on the first dielectric layer 13 of the rear substrate 10 so as to partition the discharge cells 17. The barrier rib 16 includes first barrier rib members 16a elongated in the y-axis direction and second barrier rib members 16b disposed between the first barrier rib members 16a along the y-axis direction, and having intervals, so as to be elongated in an x-axis direction. Therefore, the discharge cells 17 form a matrix structure.

The phosphor layer 19 is formed on the respective discharge cells 17. In other words, the phosphor layer 19 is formed by coating, drying and baking phosphor paste on the side surface of the barrier ribs 16 and the surface of the first dielectric layer 13 surrounded by the barrier ribs 16.

The sustain electrode 31 and the scan electrode 32 are elongated on the inner surface of the front substrate 20 in a second direction (an x-axis direction in the drawing) intersecting with the first direction so as to be continuously disposed on the adjacent discharge cells 17 in the x-axis direction. Also, the sustain electrode 31 and the scan electrode 32 have a surface discharge structure such that they face each other in the y-axis direction, corresponding to the respective discharge cells 17.

The sustain electrode 31 and the scan electrode 32 include transparent electrodes 31a and 32a which cause electric discharging and bus electrodes 31b and 32b which apply voltage signals to the transparent electrodes 31a and 32a, respectively.

The transparent electrodes 31a and 32a, which cause a surface discharge inside the discharge cell 17, are formed of transparent material (for example, Indium Tin Oxide (ITO)) in order to secure an aperture ratio of the discharge cell 17. The bus electrodes 31b and 32b are formed of metal material having an excellent electrical conductivity so as to compensate for a high electrical resistance of the transparent electrodes 31a and 32a.

The transparent electrodes 31a and 32a protrude from the outer portion of the discharge cell 17 toward the central portion thereof in the y-axis direction so as to have respective widths W31 and W32, and form a discharge gap DG in the central portion of each discharge cell 17.

The bus electrodes 31b and 32b are disposed on the transparent electrodes 31a and 32, respectively, the outer portion of the discharge cell 17 in the y-axis direction, so as to be elongated in the x-axis direction. If voltage signals are applied to the bus electrodes 31b and 32b, the voltage signals are applied to the transparent electrodes 31a and 32a connected to the respective bus electrodes 31b and 32b.

Referring to FIGS. 1 and 2, a second dielectric layer 21 covers the inner surface of the front substrate 20, the sustain electrode 31 and the scan electrode 32. The second dielectric layer 21 protects the sustain electrode 31 and the scan electrode 32 from the gas discharge, and provides a space for forming and accumulating wall charge at the time of discharge.

A protective layer 23 covers the second dielectric layer 21. For example, the protective layer 23 includes transparent MgO which protects the second dielectric layer 21 so as to increase secondary electron emission coefficient at the time of discharge.

The plasma display panel (PDP) 1 selects the turn-on discharge cell 17 by an address discharge due to interaction between the address electrode 11 and the scan electrode 32, and drives the selected discharge cell 17 by the sustain discharging due to interaction between the sustain electrode 31 and scan electrode 32 disposed on the selected discharge cell 17 so as to implement images.

In addition, the plasma display panel (PDP) 1 includes an optical filter 50. The optical filter 50 is attached to the external surface of the front substrate 20 and is formed so as to control the transmittance color which is implemented by transmittance light C10 obtained by transmitting internal light of the panel generated in the discharge cell 17 through the front substrate 20, and the reflection color which is implemented by the reflection light C20 obtained by reflecting external incident light from the front substrate 20.

Figure 3:
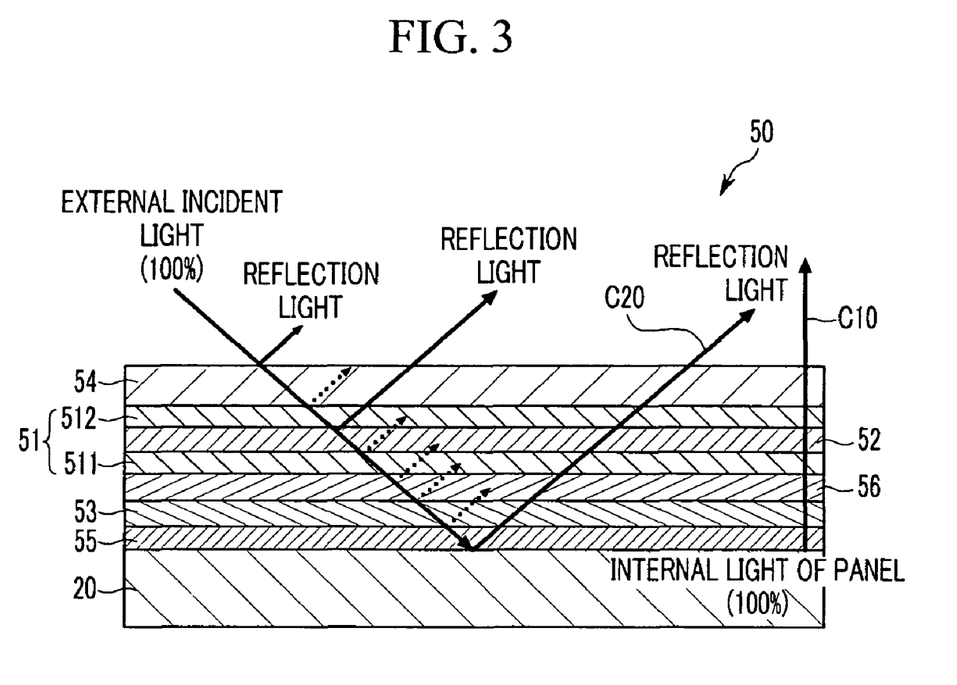
FIG. 3 is a view which illustrates transmittance and reflection of transmittance light and reflection light in an expanded cross-sectional view of an optical filter according to the first exemplary embodiment of the present invention.

FIG. 3 is a view which illustrates transmittance and reflection of transmittance light and reflection light in an expanded cross-sectional view of an optical filter according to the first exemplary embodiment of the present invention.

Referring to FIG. 3, the optical filter 50 includes a color compensating layer 51 and a reflection layer 52. The color compensating layer 51 implements the transmittance color by controlling the transmittance light C10 transmitted from the interior to the exterior of the plasma display panel (PDP) 1. The reflection layer 52 implements the reflection color by controlling the reflection light C20 which is incident from the outside on the plasma display panel (PDP) 1 and reflected.

The optical filter 50 is formed of the color compensating layer 51 and the reflection layer 52 but, in the present exemplary embodiment, it further includes an EMI shield layer 53, a hard coating layer 54, a first adhesive layer 55 and a second adhesive layer 56 which may be formed by using technology known in the art.

In addition, the color compensating layer 51 may be formed of one layer but, in the present exemplary embodiment, it includes a first color compensating layer 511 and a second color compensating layer 512 which are formed at both sides thereof, while the reflection layer 52 is disposed therebetween.

The first color compensating layer 511 is disposed on the front substrate 20 of the plasma display panel (PDP) 1. The second color compensating layer 512 is disposed at a side opposite to that of the first color compensating layer 511. That is, the first color compensating layer 511 and the second color compensating layer 512 form a double color design structure.

The color compensating layer 51, or more specifically, the first color compensating layer 511 and the second color compensating layer 512, transmits 65% to 90% of the internal light from the interior of the plasma display panel (PDP) 1 to the front substrate 20 so as to form the transmittance light C10. That is, the transmittance of the color compensating layer 51 is in the range of 65% to 90%.

If the transmittance is less than 65%, since the transmittance light C10 is excessively blocked, the implementation of transmittance color is difficult, and if the transmittance is more than 90%, the color compensating may become insignificant.

The EMI shield layer 53 is disposed between the first color compensating layer 511 and the front substrate 20 of the plasma display panel (PDP) 1, and shields the electromagnetic wave emitted to the front substrate 20. The first adhesive layer 55 is provided between the EMI shield layer 53 and the front substrate 20, and attaches the EMI shield layer 53 to the front substrate 20. The second adhesive layer 56 is provided between the first color compensating layer 511 and EMI shield layer 53, and attaches the first color compensating layer 511 to the EMI shield layer 53.

The hard coating layer 54 is disposed outside the second color compensating layer 512. The hard coating layer 54 forms an external surface of the optical filter 50, provides an external light reflection prevention function, and prevents scratch and electrification of the surface of the optical filter 50.

The reflection layer 52 reflects 10% to 60% of external light incident from the outside on the front substrate 20 of the plasma display panel (PDP) 1 so as to form reflection light C20. That is, the reflection ratio of the reflection layer 52 is in the range of 10% to 60%.

If the reflection ratio is less than 10%, since the reflection of the external light is poor, controlling of the reflection light C20 is reduced, and if the reflection ratio is more than 60%, since the reflection light C20 becomes very strong, the transmittance color by the transmittance light C10 is weakened.

The reflection layer 52 transmits 40% to 90% of the internal light generated from the interior of the plasma display panel (PDP) 1 to the front substrate 20 so as to form the transmittance light C10. That is, the transmittance of the reflection layer 52 is in the range of 40% to 90%.

If the transmittance is less than 40%, since the transmittance light C10 is excessively blocked, the transmittance color is weakened, and if the transmittance is more than 90%, the controlling of the reflection light C20 is weakened.

The reflection layer 52 may be formed of a multi-layered thin film, and may be formed of silver (Ag) or a silver alloy. For example, the silver alloy includes Ag—Au, Ag—Pd, Ag—Pt, Ag—ITO and Ag—Ni.

In addition, the reflection layer 52 may be formed of aluminum (Al) or an aluminum alloy. For example, the aluminum alloy includes Al—Au, Al—Pd, Al—ITO and Al—Ni.

Meanwhile, the effect of the external incident light generated by the first color compensating layer 511 and the second color compensating layer 512 on the intensity of the reflection light C20, and the effect of the internal panel light on the intensity of the transmittance light C10, may be represented by the equations below.

In general, the hard coating layer 54 has a reflection ratio of 5% or less and a transmittance of 90% or more, and the first and second adhesive layers 55 and 56, respectively, have a transmittance of 90% or more, which are ignored.

The effect of the second color compensating layer 512 on the intensity of the reflection light C20 is shown in Equation 1.

Effect of the second color compensating layer 512 on the reflection light=external incident light 100%×second color compensating layer absorption ratio (100%-transmittance)×reflection layer reflection ratio×second color compensating layer absorption ratio (100%-transmittance)    (Equation 1)

The effect of the first color compensating layer 511 on the intensity of the reflection light C20 is shown in Equation 2.

Effect of the first color compensating layer 511 on the reflection light=external incident light 100%×second color compensating layer transmittance×reflection layer transmittance×first color compensating layer absorption ratio (100%-transmittance)×EMI shield layer transmittance×front substrate reflection ratio×EMI shield layer transmittance×first color compensating layer absorption ratio (100%-transmittance)×reflection layer transmittance×second color compensating layer transmittance    (Equation 2)

The effect of the second color compensating layer 512 on the intensity of the transmittance light C10 is shown in Equation 3.

Effect of the second color compensating layer 512 on the transmittance light=panel internal light 100%×EMI shield layer transmittance×first color compensating layer transmittance×reflection layer transmittance×first color compensating layer absorption ratio (100%-transmittance)    (Equation 3)

The effect of the first color compensating layer 511 on the intensity of the transmittance light C10 is shown in Equation 4.

Effect of the first color compensating layer 511 on the transmittance light=panel internal light 100%×EMI shield layer transmittance×the first color compensating layer absorption ratio (100%-transmittance)    (Equation 4)

Effects of the second compensating layer 512 and the first color compensating layer 511 on the reflection light C20 and the transmittance light C10 may be calculated by using Equation 1-4.

For example, the transmittance of the second color compensating layer 512 may be 80% (absorption ratio 20%), the reflection ratio of the reflection layer 52 may be 30%, the transmittance of the first color compensating layer 511 may be 80% (absorption ratio 20%), the transmittance of the EMI shield layer 53 may be 87% and the reflection ratio of the front substrate 20 may be 25%.

By substituting it for Equation 1, the effect of the second color compensating layer 512 on the reflection light C20 may be calculated.

Effect of the second color compensating layer 512 on the reflection light=100%×20%×30%×20%=1.20%

By substituting it for Equation 2, the effect of the first color compensating layer 512 on the reflection light C20 may be calculated.

Effect of the first color compensating layer 512 on the reflection light=100%×80%×70%×20%×87%×25%×87%×20%×70%×80%=0.24%

By substituting it for Equation 3, the effect of the second color compensating layer 512 on the transmittance light C10 may be calculated.

Effect of the second color compensating layer 512 on the transmittance light=100%×87%×80%×70%×20%=2.4%

By substituting it for Equation 4, the effect of the first color compensating layer 511 on the transmittance light C10 may be calculated.

Effect of the first color compensating layer 511 on the transmittance light=100%×87%×20%=17.4%

The above is described in Table 1.

TABLE 1

Effect of the first and second color compensating layers 511 and 512, respectively, on the reflection light and transmittance light

| Effect of the second color compensating layer on the reflection light | Effect of the first color compensating layer on the reflection light | Effect of the second color compensating layer on the transmittance light | Effect of the first color compensating layer on the transmittance light |
|---|---|---|---|
| 1.20% | 0.24% | 2.4% | 17.4% |

As seen from the calculation results, if the reflection layer 52 is formed and the double color design is carried out, while the effect to the transmittance light C10 is reduced by controlling the second color compensating layer 512, the effect on the reflection light C20 may be relatively increased.

Meanwhile, in the optical filter 50 of the present exemplary embodiment, the effect of the color compensating layer on the reflection light, and the effect on the transmittance light in the known optical filter (not shown) (including the structure corresponding to the color compensating layer and EMI shield layer) which does not have a structure corresponding to that of the first color compensating layer 511 and reflection layer 52, may be represented by the following Equations 5 and 6.

Effect of the color compensating layer on the reflection light=external incident light 100%×color compensating layer absorption ratio (100%-transmittance)×EMI shield layer transmittance×front substrate reflection ratio×EMI shield layer transmittance×color compensating layer absorption ratio (100%-transmittance)    (Equation 5)

Effect of the color compensating layer on the transmittance light=panel internal light 100%×EMI shield layer transmittance×color compensating layer absorption ratio (100%-transmittance)    (Equation 6)

Effects of the color compensating layer on the reflection light and the transmittance light may be calculated by using Equation 5-6.

For example, the transmittance of the color compensating layer may be 80% (absorption ratio 20%), the transmittance of the EMI shield layer may be 87%, and the reflection ratio of the front substrate may be 25%, which are the same as those of the exemplary embodiment of the present invention.

By substituting it for Equation 5, the effect of the color compensating layer on the reflection light may be calculated.

Effect of the color compensating layer on the reflection light=100%×20%×87%×25%×87%×20%=0.76%

By substituting it for Equation 6, the effect of the color compensating layer on the transmittance light may be calculated.

Effect of the color compensating layer on the transmittance light=100%×87%×20%=17.4%

The above is described in Table 2.

TABLE 2

Effect of the color compensating layer on the reflection light and the transmittance light

| Effect of the color compensating layer on the reflection light | Effect of the color compensating layer on the transmittance light |
| --- | --- |
| 0.76% | 17.4% |

As seen in the calculation results, the effect of the color compensating layer on the reflection light is insignificant (i.e., when the color compensating layer absorbs 20% of the external light, the effect is 0.76%), but the effect on the transmittance light is significant (when the color compensating layer absorbs 20% of the external light, effect is 17.4%).

If Table 1 showing the calculation results of Equation 5-6 is compared to Table 2 showing the calculation results of Equation 1-4, in a known optical filter which has one color compensating layer, the ratio of the effects of the color compensating layer on the reflection light and the transmittance light is 0.76%/17.4%=4.4%. In the optical filter 50 according to an exemplary embodiment of the present invention, which includes the first and second color compensating layer 511 and 512, respectively, and the reflection layer 52, the ratio of the effects on the reflection light C20 and the transmittance light C10 is 1.20%/2.4%=50%.

Accordingly, in order to implement the reflection color by controlling the reflection light C20, the exemplary embodiment of the present invention is approximately 11 times more effective than a conventional arrangement.

Hereinafter, a second exemplary embodiment of the invention will be described. When the second exemplary embodiment is compared to the first exemplary embodiment, since it is similar to or the same as the first exemplary embodiment, potions common with the first exemplary embodiment will be omitted but differences will be described.

Figure 4:
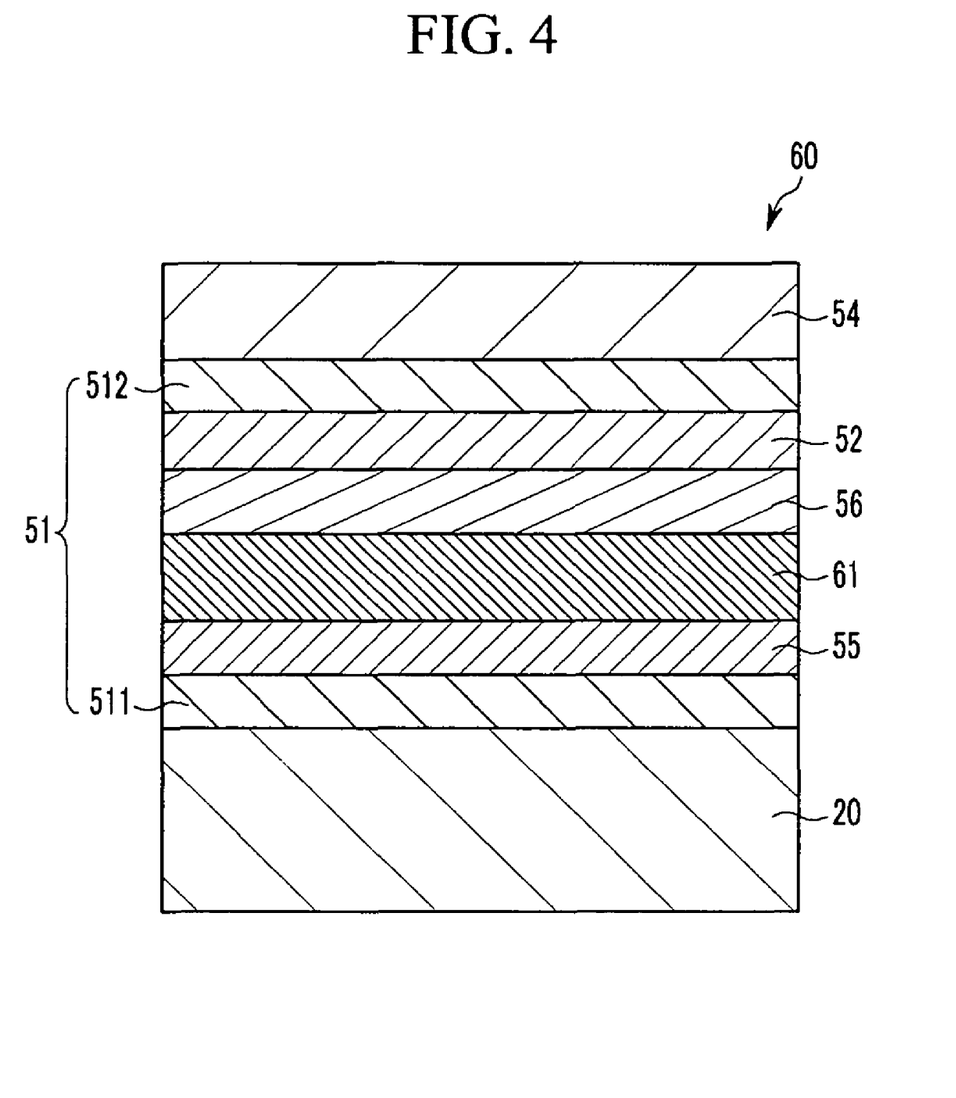
FIG. 4 is an expanded cross-sectional view of an optical filter according to a second exemplary embodiment of the present invention.

FIG. 4 is an enlarged cross-sectional view of an optical filter according to a second exemplary embodiment of the present invention.

Referring to FIG. 4, the second exemplary embodiment applies to a display panel implemented by a liquid crystal display (LCD), and therefore the optical filter 60 includes a polarizing film layer 61.

The polarizing film layer 61 is disposed between the first color compensating layer 511 and the reflection layer 52. In addition, first adhesive layer 55 is disposed between the first color compensating layer 511 and the polarizing film layer 61, and second adhesive layer 56 is disposed between the polarizing film layer 61 and the reflection layer 52.

The second exemplary embodiment illustrates the application of the present invention to various displays implemented as the display panel.

As described above, according to an exemplary embodiment of the present invention, since the color compensating layer and the reflection layer are separately provided, the transmittance light is controlled by using the color compensating layer to implement the transmittance color, and the reflection light is controlled by using the reflection layer to implement the reflection color, and therefore the implementation of the reflection color in the display becomes easy.

Since the separately provided reflection layer implements the reflection color, controlling of the reflection color (that is, limitation of color and concentration which are capable of being implemented is largely overcome) and the effect of a change in reflection color on a change in transmittance color is increased.

While this invention has been described in connection with what is presently considered to be practical exemplary embodiments, it is to be understood that the invention is not limited to the disclosed embodiments, but, on the contrary, it is intended to cover various modifications and equivalent arrangements included within the spirit and scope of the appended claims.

What is claimed is:

1. A display panel, comprising:
   a panel having a plate shape for displaying an image; and
   an optical filter connected to the panel;
   the optical filter including a color compensating layer for implementing transmittance color by controlling transmittance light passing from an interior of the panel to an exterior of the panel, and a reflection layer for implementing reflection color by controlling reflection light which is incident on the panel from the exterior of the panel, and which is reflected;
   the color compensating layer including a first color compensating layer disposed at a first side of the reflection layer facing the panel, and a second color compensating layer disposed at a second side of the reflection layer opposite to the first side; and
   said display panel further comprising an EMI shield layer disposed between the first color compensating layer and the panel.

2. The display panel of claim 1, wherein the optical filter further includes:
   a first adhesive layer disposed between the panel and the EMI shield layer; and
   a second adhesive layer disposed between the EMI shield layer and the first color compensating layer.

3. The display panel of claim 1, wherein the reflection layer has a reflection ratio in a range of 10% to 60% and reflects external light which is incident on the panel from the exterior of the panel so as to form the reflection light.

4. The display panel of claim 3, wherein the reflection layer has a transmittance in a range of 40% to 90% and transmits internal light from the interior of the panel to the exterior of the panel so as to form the transmittance light.

5. The display panel of claim 1, wherein the reflection layer is formed of any one of silver (Ag) and a silver alloy.

6. The display panel of claim 5, wherein the silver alloy is formed of any one of Ag—Au, Ag—Pd, Ag—Pt, Ag—ITO and Ag—Ni.

7. The display panel of claim 1, wherein the reflection layer is formed of any one of aluminum (Al) and aluminum alloy.

8. An optical filter, comprising:
   a panel having a plate shape for displaying an image;
   a color compensating layer for implementing transmittance color by controlling transmittance light passing from an interior of the panel to an exterior of the panel; and
   a reflection layer for implementing reflection color by controlling reflection light which is incident on the panel from the exterior of the panel, and which is reflected;

the color compensating layer including a first color compensating layer disposed at a first side of the reflection layer facing the panel, and a second color compensating layer disposed at a second side of the reflection layer opposite to the first side; and said optical filter further comprising an EMI shield layer disposed between the first color compensating layer and the panel.

9. The optical filter of claim 8, further comprising:

a first adhesive layer disposed between the panel and the EMI shield layer; and a second adhesive layer disposed between the EMI shield layer and the first color compensating layer.

10. The optical filter of claim 8, wherein each of the first color compensating layer and the second color compensating layer has a transmittance in a range of 65% to 90% and transmits internal light from the interior of the panel to the exterior of the panel so as to form the transmittance light.

11. The optical filter of claim 8, wherein the reflection layer has a reflection ratio in a range of 10% to 60% and reflects external light which is incident on the panel from the exterior of the panel so as to form the reflection light.

12. The optical filter of claim 11, wherein the reflection layer has a transmittance in a range of 40% to 90% and transmits internal light from the interior of the panel to the exterior of the panel so as to form the transmittance light.

13. The optical filter of claim 8, wherein the reflection layer is formed of any one of silver (Ag) and a silver alloy.

14. The optical filter of claim 13, wherein the silver alloy is formed of any one of Ag—Au, Ag—Pd, Ag—Pt, Ag—ITO and Ag—Ni.

15. The optical filter of claim 8, wherein the reflection layer is formed of any one of aluminum (Al) and aluminum alloy.

* * * * *